(12) United States Patent
Snitker et al.

(10) Patent No.: US 6,406,232 B1
(45) Date of Patent: Jun. 18, 2002

(54) RETRACTABLE CARGO COVER PANEL ARRANGEMENT

(76) Inventors: Earl D. Snitker; Mary Lou Snitker, both of 131 Claudia Way, Oceanside, CA (US) 92057

( * ) Notice: Subject to any disclaimer, the term of this patent is extended or adjusted under 35 U.S.C. 154(b) by 0 days.

(21) Appl. No.: 09/781,652

(22) Filed: Feb. 12, 2001

(51) Int. Cl.[7] ................................................ B60P 7/08
(52) U.S. Cl. ...................... 410/142; 410/100; 410/118; 410/141; 296/24.1; 160/290.1
(58) Field of Search ................................. 410/129, 132, 410/141, 142, 100, 118, 140; 296/24.1; 160/290.1; 248/268

(56) References Cited

U.S. PATENT DOCUMENTS

| | | | | |
|---|---|---|---|---|
| 1,564,623 A | * | 12/1925 | Ramsey | 248/268 |
| 2,624,403 A | * | 1/1953 | Zelenko | 160/290.1 X |
| 3,767,253 A | * | 10/1973 | Kluetsch | 410/118 |
| 3,782,758 A | * | 1/1974 | Williamson, III | 410/118 |
| 3,785,694 A | | 1/1974 | Sargent | |
| 4,096,807 A | * | 6/1978 | Woodward | 410/118 |
| 4,168,667 A | * | 9/1979 | Loomis | 410/118 |
| 4,226,396 A | * | 10/1980 | Bowers | 248/268 |
| 4,265,577 A | * | 5/1981 | Loomis | 410/118 |
| 4,436,466 A | * | 3/1984 | Marino | 410/118 |
| 4,556,349 A | * | 12/1985 | Koudstaal et al. | 410/140 |
| 4,701,087 A | * | 10/1987 | Cain et al. | 410/129 X |
| 4,773,802 A | * | 9/1988 | Rewis | 410/118 |
| 4,781,498 A | * | 11/1988 | Cox | 410/118 |
| 4,818,007 A | * | 4/1989 | Mahoney | 296/24.1 |
| 4,901,895 A | | 2/1990 | Gancarz | |
| 5,491,021 A | | 2/1996 | Tolliver et al. | |
| 5,632,520 A | * | 5/1997 | Butz | 410/129 X |
| 5,829,818 A | | 11/1998 | O'Daniel | |
| 5,833,413 A | * | 11/1998 | Cornelius | 410/129 X |
| 6,004,084 A | * | 12/1999 | Möker | 410/118 |
| 6,109,846 A | * | 8/2000 | Davis et al. | 410/100 |
| 6,183,177 B1 | * | 2/2001 | Dahlgren | 410/100 |
| 6,196,508 B1 | * | 3/2001 | Niji | 248/268 X |
| 6,206,623 B1 | * | 3/2001 | Podd | 410/130 |
| 6,302,465 B1 | * | 10/2001 | Faber et al. | 410/129 X |

* cited by examiner

Primary Examiner—Stephen T. Gordon
(74) Attorney, Agent, or Firm—Henderson & Sturm LLP

(57) ABSTRACT

A retractable cargo cover arrangement (10) for the interior of the cargo hold (200) of a freight carrier wherein the cover arrangement (10) includes a generally elongated rectangular cover member (20) fabricated from a sheet of waterproof material (21) and having an upper end affixed to, and wrapped around, a spring loaded retraction cylinder (22) and a lower end affixed to an elongated dowel (24) in a window shade fashion; wherein, the arrangement further includes a first pair of brackets (30), (40) for suspending the upper portion of the cover member (20) in the upper portion of the cargo hold (200) and a second pair of brackets (60) (70) for releasably engaging the lower portion of the cover member (20) in the lower portion of the cargo hold (200) to prevent water damage to the cargo (100) contained within the cargo hold (200).

9 Claims, 2 Drawing Sheets

RETRACTABLE CARGO COVER PANEL ARRANGEMENT

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of protective cover arrangements for cargo in general and in particular to an internally mounted retractable cargo cover panel that will protect the contents of a freight truck or trailer.

2. Description of Related Art

As can be seen by reference to the following U.S. Pat. Nos. 3,785,694; 4,901,895; 5,491,021 and 5,829,818, the prior art is replete with myriad and diverse protective cover arrangements for the exterior of a truck, semi-trailer or the like.

While all of the aforementioned prior art constructions are more than adequate for the basic purpose and function for which they have been specifically designed, they are uniformly deficient with respect to their failure to provide a simple, efficient, and practical internally mounted protective arrangement that will prevent moisture or debris from being deposited onto the cargo contained within the cargo hold of a freight transporting vehicle.

As most freight handlers are all too well aware, millions of dollars of damage a year are incurred by cargo due to water that seeps into and/or is blown into the cargo hold of freight carriers in the normal course of transporting cargo from one location to another.

As a consequence of the foregoing situation, there has existed a longstanding need among freight handlers for a new and improved protective cover arrangement that is quick and easy to install and use, and which will virtually eliminate the possibility that cargo will suffer water damage during transport; and, the provision of such an arrangement is the stated objective of the present invention.

BRIEF SUMMARY OF THE INVENTION

Briefly stated, the retractable cargo cover arrangement that forms the basis of the present invention comprises in general a retractable cover unit and a retention unit.

As will be explained in greater detail further on in the specification, the retractable cover unit is an oversized version of a retractable window shade and includes a generally elongated rectangular cover member fabricated from waterproof material and having an upper end affixed to, and wound around, a spring loaded retraction cylinder having a pair of mounting stubs and a lower end affixed to an elongated dowel likewise provided with a pair of mounting stubs.

In addition, the retention unit includes a first pair of upper bracket members adapted to releasably engage the mounting stubs on the spring loaded retraction cylinder and a second pair of lower bracket members adapted to releasably engage the mounting stubs on the elongated dowel when the cover member is fully retracted (relative to the spring loaded retraction cylinder) to provide a waterproof barrier between the cargo contained within the cargo hold and the cargo hold opening.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
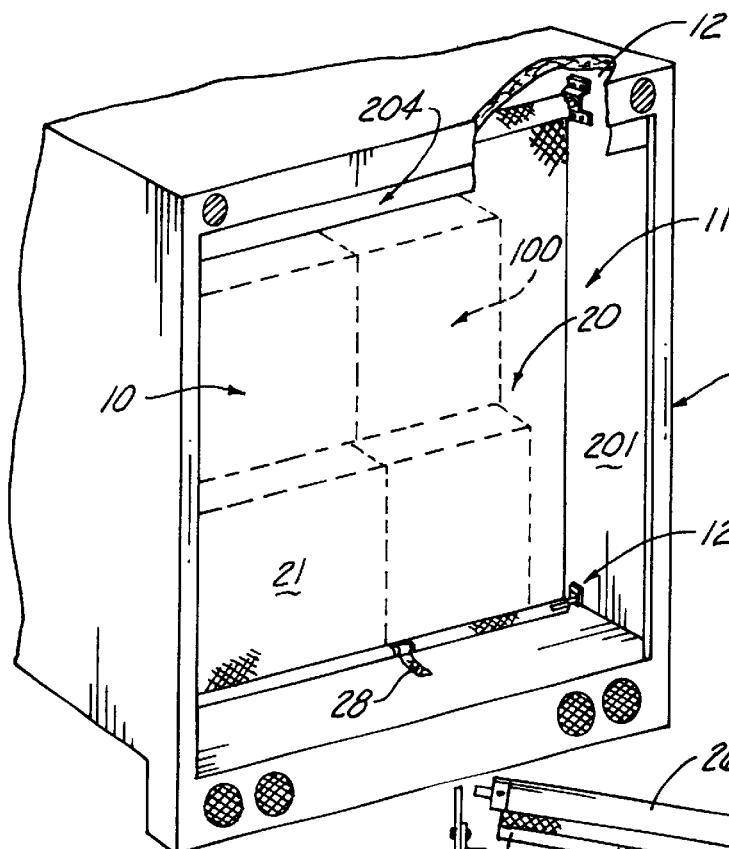
FIG. 1 is a perspective view of the retractable cargo cover arrangement disposed in the cargo hold of a freight carrier.

As can be seen by reference to the drawings, and in particular to FIG. 1, the retractable cargo cover arrangement that forms the basis of the present invention is designated generally by the reference number 10. The arrangement 10 comprises in general a retractable cover unit 11 and a retention unit 12. These units will now be described in seriatim fashion.

Figure 2:
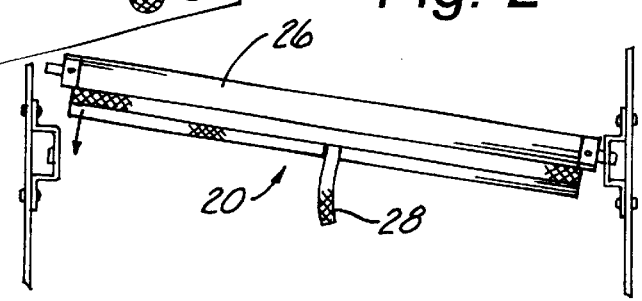
FIG. 2 is an isolated perspective view of the retractable cover unit partially engaged with the upper portion of the retention unit.
Figure 3:
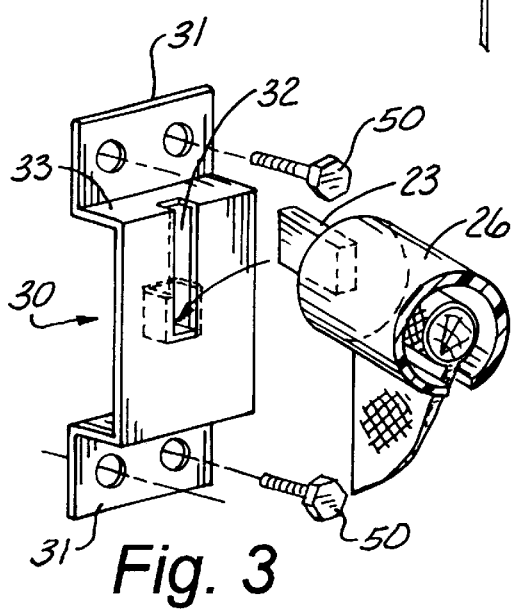
FIG. 3 is an exploded perspective view of one side of the upper end of the cover unit with one side of the upper portion of the retention unit.
Figure 4:
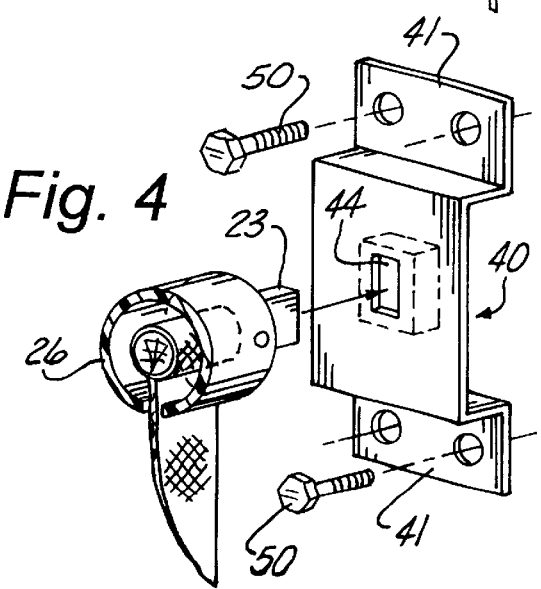
FIG. 4 is an exploded perspective view of the other side of the upper end of the cover unit with one side of the upper portion of the retention unit.
Figure 5:
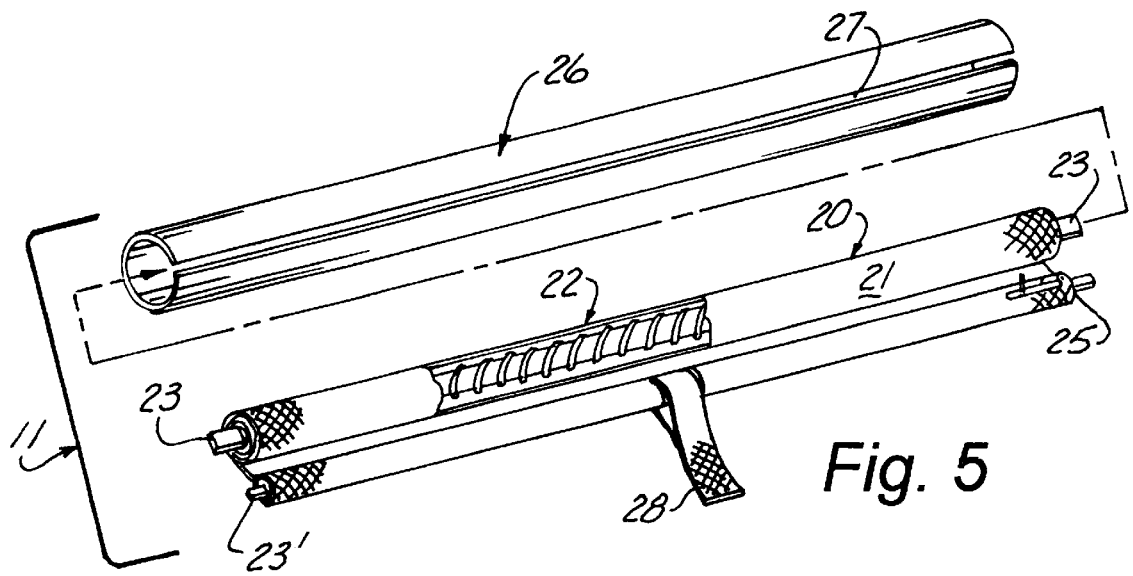
FIG. 5 is an exploded view of the cover unit.

As can best be seen by reference to FIGS. 2 and 5, the retractable cover unit 11 comprises a generally elongated rectangular flexible cover member 20 fabricated from a sheet of waterproof material 21 wherein the upper end of the cover member 20 is wound around a spring loaded retraction cylinder 22 identical in construction to a conventional retractable window shade arrangement wherein the opposite ends of the retraction cylinder 22 are proved with aligned outwardly projecting fixed mounting stubs 23.

Figure 7:
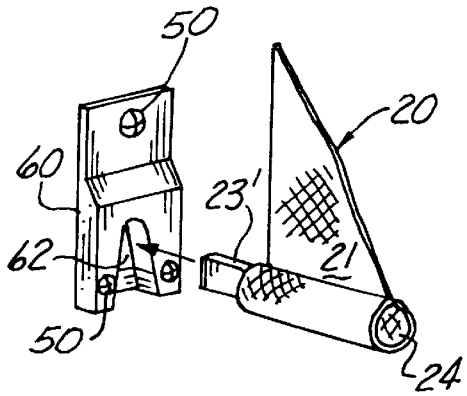
FIG. 7 shows the engagement of one side of the lower portion of the cover unit with one side of the lower portion of the retention unit.
Figure 8:
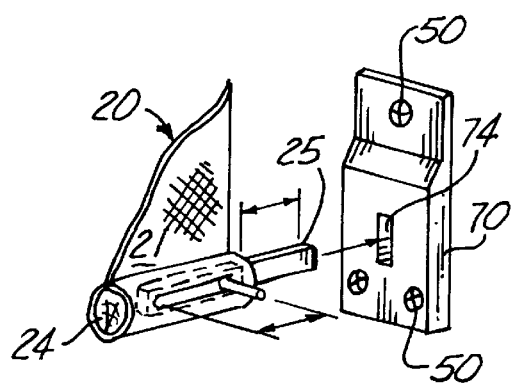
FIG. 8 shows the engagement of the other side of the lower portion of the cover unit with the other side of the lower portion of the retention unit.

In addition, as shown in FIGS. 5, 7, and 8, the lower end of the cover member 20 is secured to an elongated dowel 24 whose opposite ends are provided with a fixed mounting stub 23' and a retractable mounting stub 25 respectively for reasons that will be explained in greater detail further on in the specification.

Returning once more to FIG. 5, it can be seen that the cover unit 11 may also comprise an elongated hollow cylindrical housing member 26 dimensioned to receive the cover member 20 and provided with an elongated slit 27 that will allow all of the cover member 20 with the exception of the dowel 24 on the lower end of the cover member 20 to be retracted within the housing member 26 in a well recognized fashion while still maintaining a uniform exterior diameter as the cover member 20 unrolls from within the interior of the housing member 26.

Figure 6:
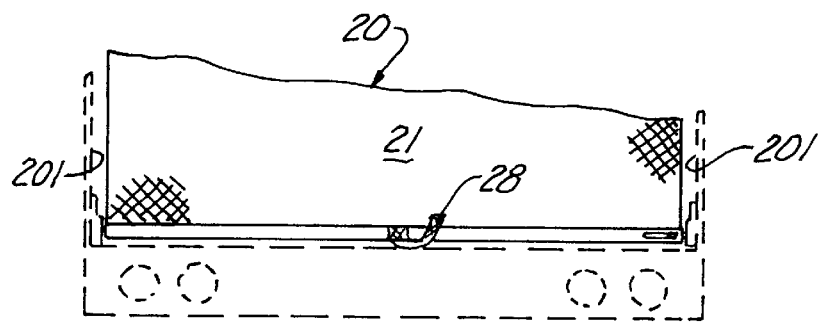
FIG. 6 is an end view of the lower portion of the protective cover arrangement.

As can also be seen by references to FIG. 5, as well as FIGS. 1, 2, and 6, the lower end of the cover member 20 is further provided with a strap element 28 that can be used to initiate the withdrawal and retraction of the window shade style cover member 20 from within the housing member 26.

Turning now to FIGS. 1 through 4, it can be seen that the upper portion of the retention unit 12 comprises a first pair of generally U-shaped bracket members 30 and 40 each having apertured flanges 31 and 41 which are dimensioned to receive conventional fastening means 50 for securing the bracket members 30, 40 to the upper portion of the interior sidewalls 201 of a cargo hold 200.

In addition, one of the bracket members 30 is provided with an elongated slot 32 which extends upwardly form the midpoint of the bracket member 30 into the upper leg 33 of the generally U-shaped configuration of the bracket member 30; and, the other bracket member 40 is provided with a centrally disposed slot 44 whereby the slots 32 and 44 are both dimensioned to receive the stationary mounting stubs 23 on the upper portion of the cover member 20 in a well recognized fashion.

Turning now to FIGS. 7 and 8, it can be seen that the lower portion of the retention unit 12 includes a pair of generally rectangular lower bracket members 60 and 70 fixedly secured by conventional fastening means 50 to the interior walls 201 of a cargo hold wherein one of the lower bracket members 70 has a centrally disposed slot 74 dimensioned to receive the retractable mounting stub 25 on the elongated dowel 24 and the other lower bracket member 60 has an elongated tapered slot 62 which extends upwardly from the bottom of the mounting bracket 60 and is dimensioned to receive the fixed mounting stub 23' on the other end of the elongated dowel 24.

By now it should be appreciated that the retractable cargo cover arrangement 10 that forms the basis of the present invention can be quickly and easily installed in the cargo hold 200 of a freight carrier to form a secondary interior barrier that will prevent water that seeps into or is blown into the interior of the cargo hold past the cargo hold door 204 from being deposited on the cargo 100 that is stored behind the retractable cargo cover arrangement 10.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

We claim:

1. A retractable cargo cover arrangement for the interior of the cargo hold of a freight carrier to prevent water from being deposited onto the contents of the cargo hold, wherein the arrangement comprises:

a cover unit including an elongated rectangular cover member fabricated from a sheet of waterproof material and having an upper end wrapped around a spring loaded retraction cylinder having opposite ends provided with fixed mounting stubs and having a lower end secured to an elongated dowel; and a retention unit including first means for releasably suspending the spring loaded retraction cylinder from the upper portion of the cargo hold adjacent a cargo hold opening; and second means for releasably engaging the elongated dowel adjacent to the lower portion of the cargo hold proximate the cargo hold opening.

2. The arrangement as in claim 1, wherein the lower end of the cover member is further provided with a strap element.

3. The arrangement as in claim 2, wherein the cover unit further includes:

an elongated hollow cylindrical housing member dimensioned to receive at least a substantial portion of said cover member and provided with an elongated slit that allows said substantial portion of the cover member to be withdrawn and retracted relative to the cylindrical housing member.

4. The arrangement as in claim 2, wherein said first means comprises:

a first pair of generally U-shaped upper bracket members fixedly secured at opposed locations on the upper portion of the interior of the cargo hold wherein both of said first pair of bracket members is adapted to releasably engage the mounting stubs on the opposite end of the spring loaded retractable cylinder.

5. The arrangement as in claim 4, wherein said second means comprises:

a second pair of lower mounting brackets fixedly secured at opposed locations on the lower portion of the interior of the cargo hold wherein both of said lower pairs of mounting brackets are adapted to releasably engage the opposite ends of the elongated dowel.

6. The arrangement as in claim 5, wherein the opposite ends of the elongated dowel are provided with a fixed mounting stub and a retractable mounting stub.

7. The arrangement as in claim 6, wherein at least one bracket in both the first and second pair of brackets is provided with a central opening dimensioned to receive a selected one of said mounting stubs.

8. The arrangement as in claim 6, wherein at least one bracket in both the first and second pair of brackets is provided with an elongated vertically disposed slot dimensioned to receive a selected one of said mounting stubs.

9. The arrangement as in claim 7, wherein at least one bracket in both the first and second pair of brackets is provided with an elongated vertically disposed slot dimensioned to receive a selected one of said mounting stubs.

* * * * *